(12) United States Patent
Zhang et al.

(10) Patent No.: US 12,237,720 B2
(45) Date of Patent: Feb. 25, 2025

(54) ELECTRIC MACHINE THERMAL MANAGEMENT

(71) Applicant: FORD GLOBAL TECHNOLOGIES, LLC, Dearborn, MI (US)

(72) Inventors: Dengfu Zhang, Northville, MI (US); Brian Christian Orr, Macomb, MI (US); Alfredo R. Munoz, Ann Arbor, MI (US); Franco Leonardi, Dearborn Heights, MI (US); Joel Hetrick, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 452 days.

(21) Appl. No.: 17/737,497

(22) Filed: May 5, 2022

(65) Prior Publication Data

US 2023/0361633 A1 Nov. 9, 2023

(51) Int. Cl.
*H02K 1/18* (2006.01)
*H02K 5/20* (2006.01)
*H02K 9/193* (2006.01)
*B60K 6/26* (2007.10)

(52) U.S. Cl.
CPC ............. *H02K 1/185* (2013.01); *H02K 5/203* (2021.01); *H02K 9/193* (2013.01); *B60K 6/26* (2013.01); *B60Y 2200/91* (2013.01); *B60Y 2200/92* (2013.01); *B60Y 2306/05* (2013.01); *B60Y 2400/60* (2013.01); *H02K 2205/09* (2013.01)

(58) Field of Classification Search
CPC .......... H02K 1/185; H02K 9/227; H02K 1/20; H02K 5/203; H02K 2213/03; H02K 9/193; H02K 1/16; H02K 21/16; B60K 6/445; B60K 6/365; B60K 6/38

See application file for complete search history.

(56) References Cited

U.S. PATENT DOCUMENTS

| 5,491,371 | A | 2/1996 | Ooi | |
| 8,395,287 | B2* | 3/2013 | Bradfield | H02K 1/20 |
| | | | | 310/58 |
| 8,427,018 | B2* | 4/2013 | Dutau | H02K 1/20 |
| | | | | 310/58 |
| 9,735,630 | B2* | 8/2017 | Chong | H02K 1/185 |
| 10,097,066 | B2 | 10/2018 | Hanumalagutti et al. | |

(Continued)

FOREIGN PATENT DOCUMENTS

CN 112467912 U 3/2021
JP 2005012961 A 1/2005

*Primary Examiner* — Leda T Pham
(74) *Attorney, Agent, or Firm* — David B Kelley; Brooks Kushman P.C.

(57) ABSTRACT

An electric machine including a stator core having an outer circumferential surface and an axial row of raised projections that extend radially outboard from the outer surface. The raised projections are axially spaced from each other to define circumferential channels therebetween. A housing defines a cavity that receives the stator core. The housing has an inner circumferential surface in contact with the raised projections and radially spaced from the outer surface of the core to define a void space in fluid communication with the channels. The void space and the channels cooperate to form a fluid circuit that overlays the outer circumferential surface such that the fluid is in direct contact with the stator core.

19 Claims, 6 Drawing Sheets

(56) References Cited

U.S. PATENT DOCUMENTS

| | | | |
|---|---|---|---|
| 11,424,659 B2* | 8/2022 | Kozarekar | H02K 1/16 |
| 2014/0265670 A1 | 9/2014 | Chamberlin et al. | |
| 2021/0394611 A1* | 12/2021 | Wang | H02K 5/203 |

* cited by examiner

ELECTRIC MACHINE THERMAL MANAGEMENT

TECHNICAL FIELD

The present disclosure relates to electric machines for use with electric and hybrid-electric vehicles and more specifically to thermal management of the electric machines.

BACKGROUND

Vehicles such as battery-electric vehicles and hybrid-electric vehicles contain a traction-battery assembly to act as an energy source. The traction-battery assembly, for example, is electrically connected to an electric machine that provides torque to driven wheels. The traction-battery assembly may include components and systems to assist in managing vehicle performance and operations. It may also include high-voltage components, and an air or liquid thermal-management system to control temperature.

Electric machines typically include a stator and a rotor that cooperate to convert electrical energy into mechanical motion or vice versa. Electric machines may include thermal-management systems to cool the stator, rotor, or both.

SUMMARY

According to one embodiment, an electric machine includes a stator core having an outer circumferential surface and an axial row of raised projections that extend radially outboard from the outer surface. The raised projections are axially spaced from each other to define circumferential channels therebetween. A housing defines a cavity that receives the stator core. The housing has an inner circumferential surface in contact with the raised projections and radially spaced from the outer surface of the core to define a void space in fluid communication with the channels. The void space and the channels cooperate to form a fluid circuit that overlays the outer circumferential surface such that the fluid is in direct contact with the stator core.

According to another embodiment, an electric machine includes a stator having a core and windings supported on the core. The core has a row of raised projections that alternate in an axial direction of the core to define circumferential channels therebetween. A housing defines a cavity that receives the stator core with the projections engaging with a wall of the cavity, wherein the cavity and the core cooperate to define a void space in fluid communication with the channels to form a fluid circuit in direct contact with the stator core.

According to yet another embodiment, a vehicle powertrain includes a housing defining a cavity having an inner circumferential surface defining an upper fluid-supply orifice, a lower drain, and an axial groove recessed into the inner surface. An electric machine is received in the cavity and includes a stator core having an axial row of raised projections that extend radially outboard from an outer surface of the stator core to contact the inner surface of the housing to form a void space between the inner and outer circumferential surfaces. The projections are axially spaced relative to each other to define circumferential channels in fluid communication with the void space, the upper fluid-supply orifice, the lower drain, and the axial groove to form a fluid circuit. The axial groove is located adjacent to the row of raised projections and configured to receive separated fluid flow from the channels and release the fluid to the void space as a laminar flow.

DETAILED DESCRIPTION

Figure 1:
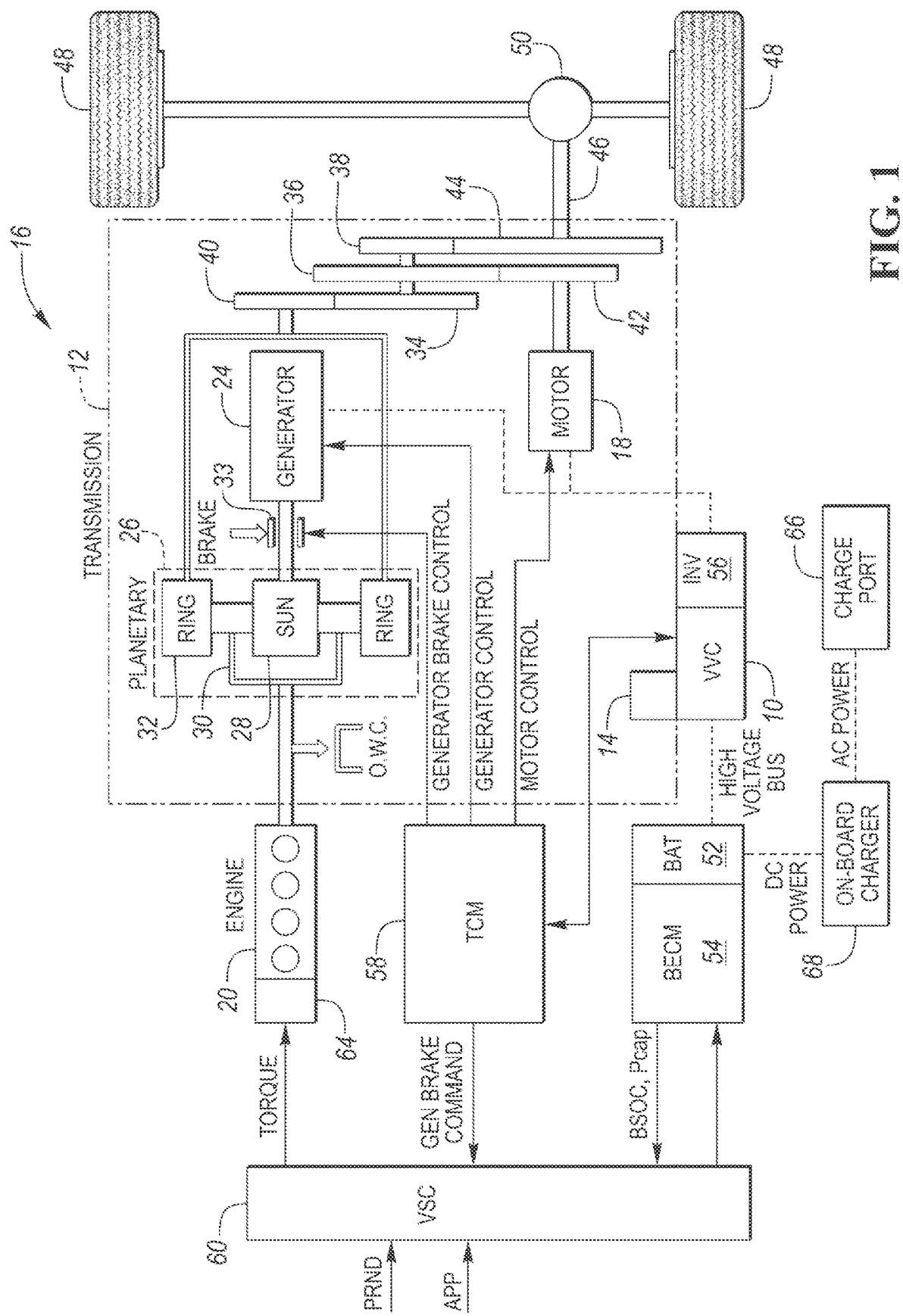
FIG. 1 is a schematic diagram of an example hybrid vehicle.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis is shown in the figures and described below. Terms such as "outer" and "inner" are relative to the central axis. For example, an "outer" surface means that the surfaces faces away from the central axis, or is outboard of another "inner" surface. Terms such as "radial," "diameter," "circumference," etc. also are relative to the central axis. The terms "front," "rear," "upper" and "lower" designate directions in the drawings to which reference is made. The terms, connected, attached, etc., refer to directly or indirectly connected, attached, etc., unless otherwise indicated explicitly or by context.

An example plugin-hybrid-electric vehicle (PHEV) is depicted in FIG. 1 and referred to generally as a vehicle 16. The vehicle 16 includes a transmission 12 and is propelled by at least one electric machine 18 with selective assistance from an internal combustion engine 20. The electric machine 18 may be an alternating current (AC) electric motor depicted as "motor" 18 in FIG. 1. The electric machine 18 receives electrical power and provides torque for vehicle propulsion. The electric machine 18 also functions as a generator for converting mechanical power into electrical power through regenerative braking.

The transmission 12 may be a power-split configuration. The transmission 12 includes the first electric machine 18 and a second electric machine 24. The second electric machine 24 may be an AC electric motor depicted as "generator" 24 in FIG. 1. Like the first electric machine 18, the second electric machine 24 receives electrical power and provides output torque. The second electric machine 24 also functions as a generator for converting mechanical power into electrical power and optimizing power flow through the transmission 12. In other embodiments, the transmission does not have a power-split configuration.

The transmission 12 may include a planetary gear unit 26, which includes a sun gear 28, a planet carrier 30, and a ring gear 32. The sun gear 28 is connected to an output shaft of the second electric machine 24 for receiving generator torque. The planet carrier 30 is connected to an output shaft of the engine 20 for receiving engine torque. The planetary gear unit 26 combines the generator torque and the engine torque and provides a combined output torque about the ring gear 32. The planetary gear unit 26 functions as a continuously variable transmission, without any fixed or "step" ratios.

The transmission 12 may also include a one-way clutch (O.W.C.) and a generator brake 33. The O.W.C. is coupled to the output shaft of the engine 20 to only allow the output shaft to rotate in one direction. The O.W.C. prevents the transmission 12 from back-driving the engine 20. The generator brake 33 is coupled to the output shaft of the second electric machine 24. The generator brake 33 may be activated to "brake" or prevent rotation of the output shaft of the second electric machine 24 and of the sun gear 28. Alternatively, the O.W.C. and the generator brake 33 may be eliminated and replaced by control strategies for the engine 20 and the second electric machine 24.

The transmission 12 may further include a countershaft having intermediate gears including a first gear 34, a second gear 36 and a third gear 38. A planetary output gear 40 is connected to the ring gear 32. The planetary output gear 40 meshes with the first gear 34 for transferring torque between the planetary gear unit 26 and the countershaft. An output gear 42 is connected to an output shaft of the first electric machine 18. The output gear 42 meshes with the second gear 36 for transferring torque between the first electric machine 18 and the countershaft. A transmission output gear 44 is connected to a driveshaft 46. The driveshaft 46 is coupled to a pair of driven wheels 48 through a differential 50. The transmission output gear 44 meshes with the third gear 38 for transferring torque between the transmission 12 and the driven wheels 48.

The vehicle 16 includes an energy storage device, such as a traction battery 52 for storing electrical energy. The battery 52 is a high-voltage battery that is capable of outputting electrical power to operate the first electric machine 18 and the second electric machine 24. The battery 52 also receives electrical power from the first electric machine 18 and the second electric machine 24 when they are operating as generators. The battery 52 is a battery pack made up of several battery modules (not shown), where each battery module contains a plurality of battery cells (not shown). Other embodiments of the vehicle 16 contemplate different types of energy storage devices, such as capacitors and fuel cells (not shown) that supplement or replace the battery 52. A high-voltage bus electrically connects the battery 52 to the first electric machine 18 and to the second electric machine 24.

The vehicle includes a battery energy control module (BECM) 54 for controlling the battery 52. The BECM 54 receives input that is indicative of vehicle conditions and battery conditions, such as battery temperature, voltage and current. The BECM 54 calculates and estimates battery parameters, such as battery state of charge and the battery power capability. The BECM 54 provides output (BSOC, $P_{cap}$) that is indicative of a battery state of charge (BSOC) and a battery power capability ($P_{cap}$) to other vehicle systems and controllers.

The vehicle 16 includes a DC-DC converter or variable voltage converter (VVC) 10 and an inverter 56. The VVC 10 and the inverter 56 are electrically connected between the traction battery 52 and the first electric machine 18, and between the battery 52 and the second electric machine 24. The VVC 10 "boosts" or increases the voltage potential of the electrical power provided by the battery 52. The VVC 10 also "bucks" or decreases the voltage potential of the electrical power provided to the battery 52, according to one or more embodiments. The inverter 56 inverts the DC power supplied by the main battery 52 (through the VVC 10) to AC power for operating the electric machines 18, 24. The inverter 56 also rectifies AC power provided by the electric machines 18, 24, to DC for charging the traction battery 52. Other embodiments of the transmission 12 include multiple inverters (not shown), such as one invertor associated with each electric machine 18, 24. The VVC 10 includes an inductor assembly 14.

The transmission 12 includes a transmission control module (TCM) 58 for controlling the electric machines 18, 24, the VVC 10 and the inverter 56. The TCM 58 is configured to monitor, among other things, the position, speed, and power consumption of the electric machines 18, 24. The TCM 58 also monitors electrical parameters (e.g., voltage and current) at various locations within the VVC 10 and the inverter 56. The TCM 58 provides output signals corresponding to this information to other vehicle systems.

The vehicle 16 includes a vehicle system controller (VSC) 60 that communicates with other vehicle systems and controllers for coordinating their function. Although it is shown as a single controller, the VSC 60 may include multiple controllers that may be used to control multiple vehicle systems according to an overall vehicle control logic, or software.

The vehicle controllers, including the VSC 60 and the TCM 58 generally includes any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The VSC 60 communicates with other vehicle systems and controllers (e.g., the BECM 54 and the TCM 58) over one or more wired or wireless vehicle connections using common bus protocols (e.g., CAN and LIN). The VSC 60 receives input (PRND) that represents a current position of the transmission 12 (e.g., park, reverse, neutral or drive). The VSC 60 also receives input (APP) that represents an accelerator pedal position. The VSC 60 provides output that represents a desired wheel torque, desired engine speed, and generator brake command to the TCM 58, and contactor control to the BECM 54.

The vehicle 16 includes an engine control module (ECM) 64 for controlling the engine 20. The VSC 60 provides output (desired engine torque) to the ECM 64 that is based on a number of input signals including APP, and corresponds to a driver's request for vehicle propulsion.

If the vehicle 16 is a PHEV, the battery 52 may periodically receive AC energy from an external power supply or grid, via a charge port 66. The vehicle 16 also includes an on-board charger 68, which receives the AC energy from the charge port 66. The charger 68 is an AC/DC converter which converts the received AC energy into DC energy suitable for charging the battery 52. In turn, the charger 68 supplies the DC energy to the battery 52 during recharging. Although illustrated and described in the context of a PHEV 16, it is understood that the electric machines 18, 24 may be implemented on other types of electric vehicles, such as a hybrid-electric vehicle or a fully electric vehicle that does not include an engine.

Figure 2:
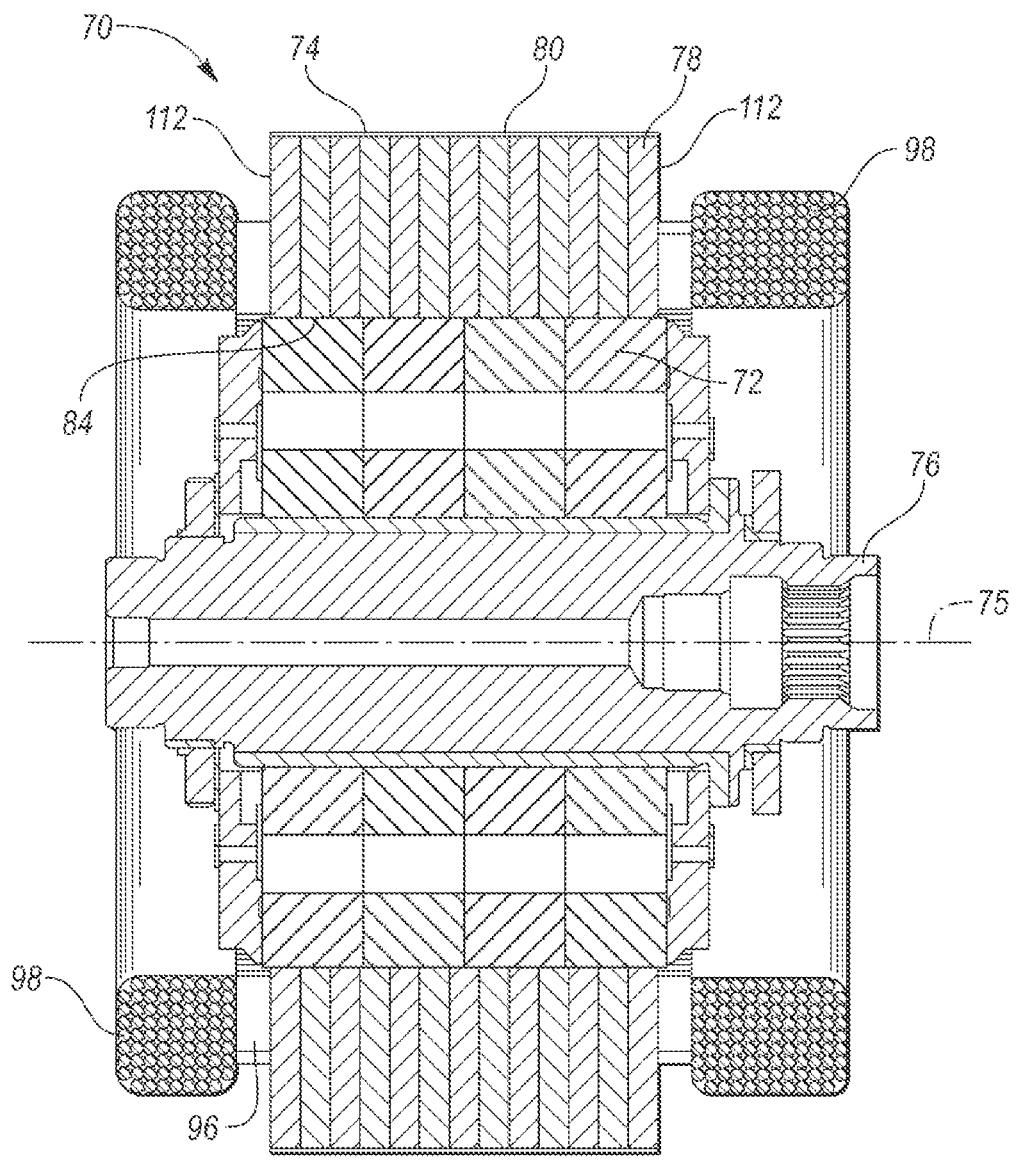
FIG. 2 is side view, in cross section, of a portion of an example electric machine.
Figure 3:
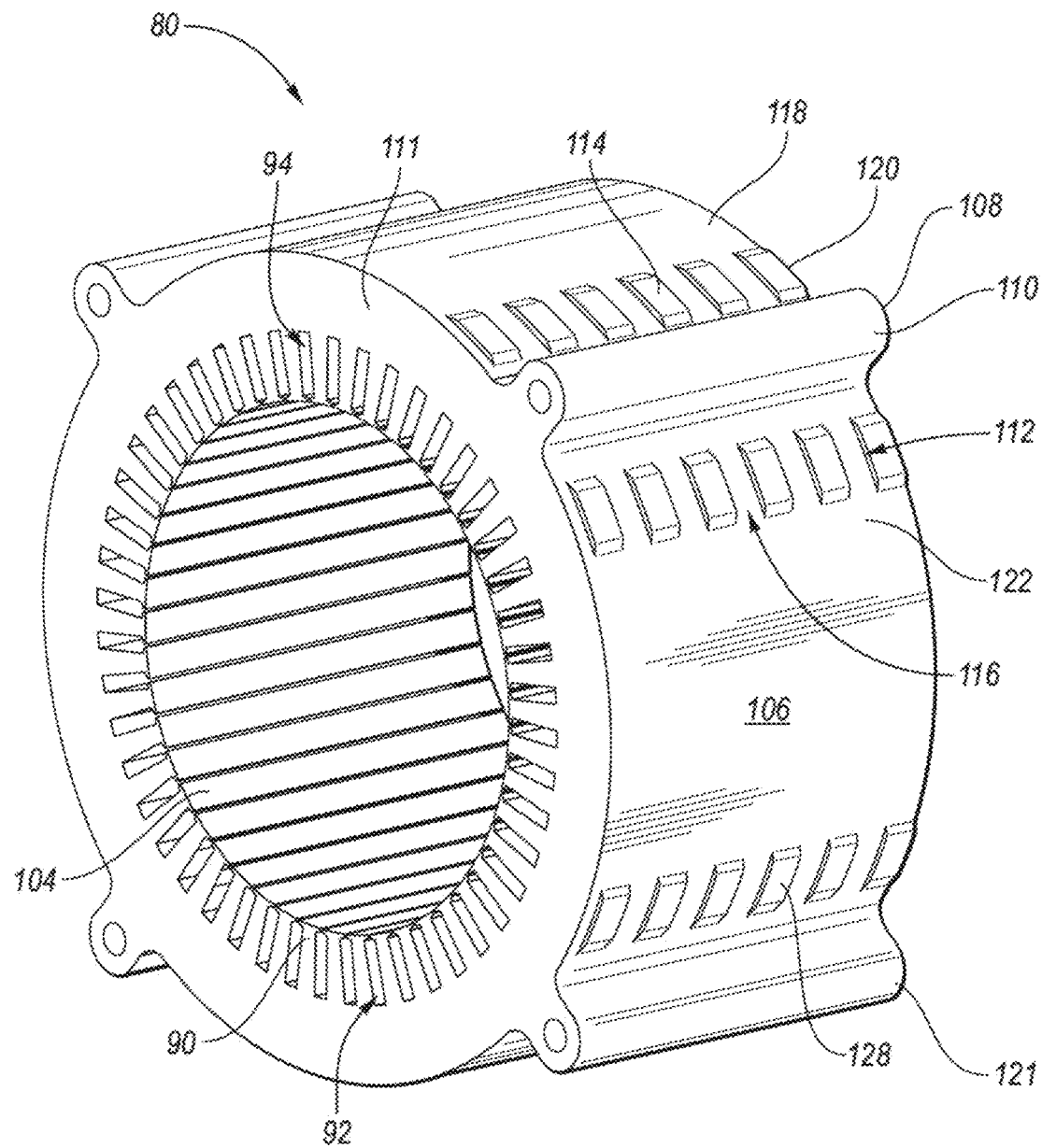
FIG. 3 is a perspective view of a stator core.

Referring to FIGS. 2, and 3, an example electric machine 70 includes a stator 74 having a plurality of laminations 78. The electric machine 70 has a central axis 75. Each of the laminations 78 includes a front side and a back side. When stacked, the front and back sides are disposed against adjacent front and back sides to form a stator core 80. Each of the laminations 78 may define a hollow center.

Each lamination 78 includes an inner diameter 84 defining a plurality of teeth 90 extending radially inward toward the inner diameter 84. Adjacent teeth 90 cooperate to define slots 92. The teeth 90 and the slots 92 of each lamination 78 are aligned with adjacent laminations to define stator slots 94 extending axially through the stator core 80 between the opposing end faces 111. The end faces 111 define the opposing ends of the core 80 and are formed by the first and last laminations of the stator core 80. A plurality of windings (also known as coils, wires, or conductors) 96 are wrapped around the stator core 80 and are disposed within the stator slots 94. The windings 96 may be disposed in an insulating material (not shown). Portions of the windings 96 generally extend in an axial direction along the stator slots 94. At the end faces 111 of the stator core 80, the windings bend to extend circumferentially around the end faces 111 of the stator core 80 forming the end windings 98. While shown as having distributed windings, the windings could also be of the concentrated or hairpin type.

A rotor 72 is disposed within the cavity 88 of the stator 74. The rotor 72 is fixed to a shaft 76 that is operably connected to the gearbox. When current is supplied to the stator 74, a magnetic field is created causing the rotor 72 to spin within the stator 74 generating a torque that is supplied to the gear box via one or more shafts or gears, or the like.

The core 80 includes an inner diameter 104 and an outer diameter 106 that are each concentric with a center of the core 80. Mounting ears 108 are disposed radially outboard of the outer diameter 106. In the illustrated embodiment, the stator core 80 includes four mounting ears 108. Each of the mounting ears 108 may include an arcuate outer surface 110. The stator core 80 defines axial rows 112 of raised projections 114 that extend radially outboard from the outer surface 106. In each row, the raised projections 114 are axially spaced from each other to define circumferential channels 116 therebetween. As we described in more detail below, the axial rows of raised projections are used in the cooling circuit. In the illustrated embodiment, the stator core 80 has eight axial rows 112 with the rows 112 being placed adjacent to the mounting ears 108. That is, rows 112 associated with each ear 108 are disposed on opposing sides of the ear.

The raised projections 114 may be an integrally formed portion of the laminations. For example, the stator is formed of a plurality of stacked laminations including a first set 118 having projection tabs 120 that form the projections 114 and a second set 122 that does not include projection tabs to form the channels 116. Each of the sets includes a plurality of laminations. The sets 118 and 122 are arranged in groups of multiple laminations to form the projections 114 and the channels 116. As shown, the groups alternate in the longitudinal direction of the stator core 80. The laminations of both the first and second sets 118, 120 includes mounting tabs 121 that cooperate to define the mounting ears 108 that connect with the housing. The number of laminations in each group may be equal as shown, or alternatively may include different numbers of laminations to increase or decrease the axial distance of the channels 116 relative to the axial distance of the projections 114. In the illustrated embodiments, the raised projections 114 of the rows 112 are aligned with one another, i.e., are located at the same axial position.

Figure 4:
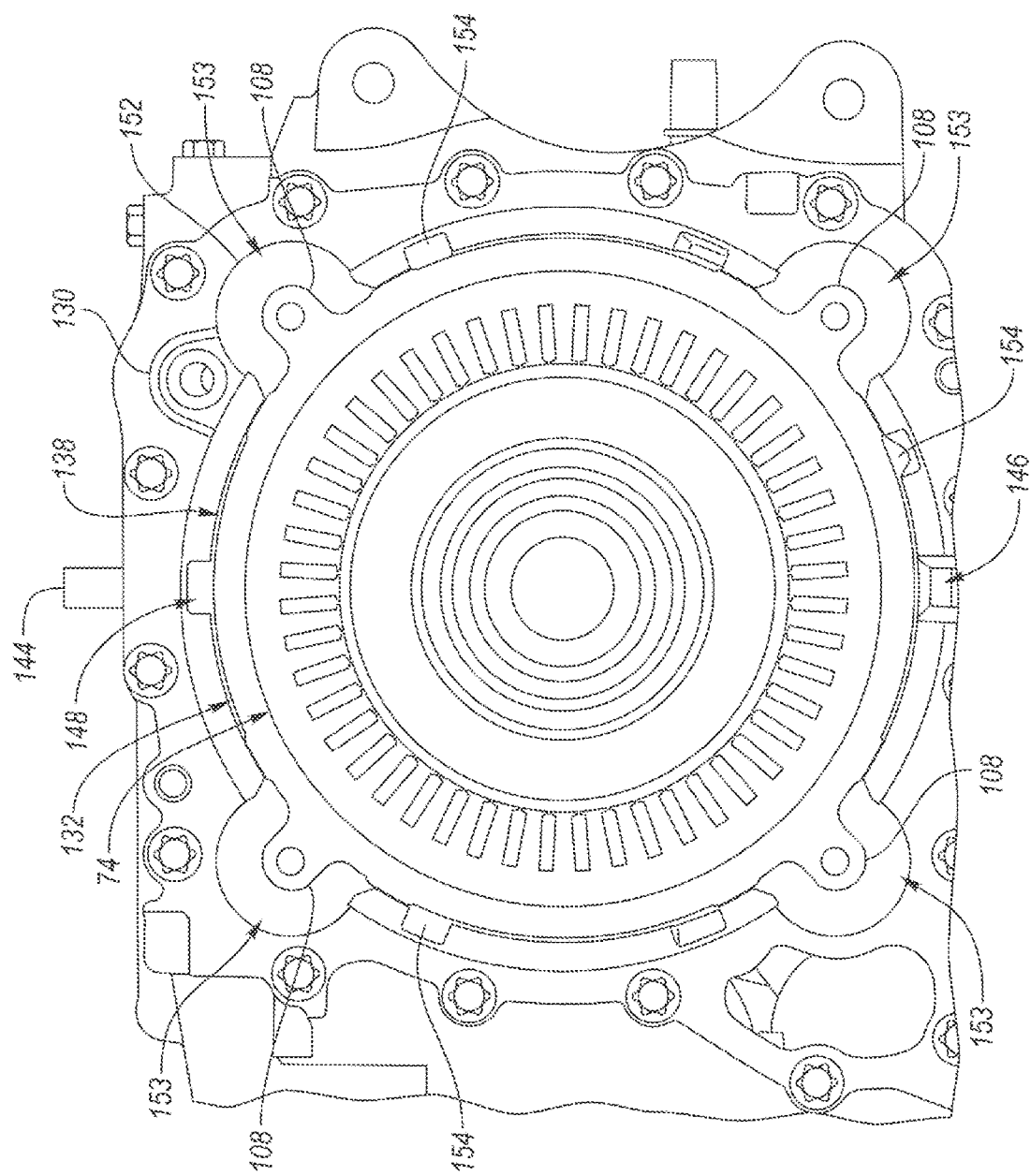
FIG. 4 as a front view of an electric machine received within a cavity of a housing.
Figure 5:
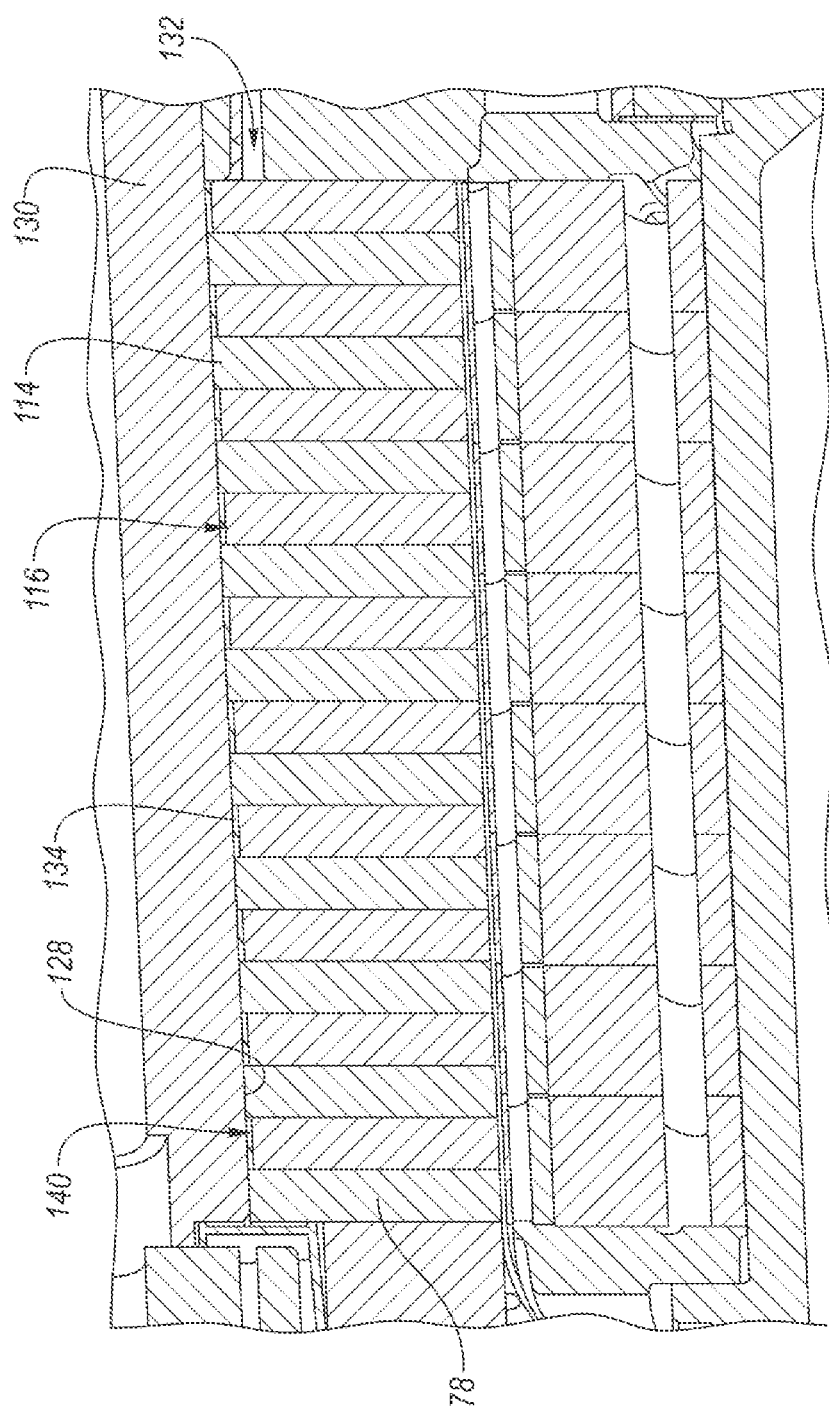
FIG. 5 is a cross-sectional view of the housing and electric machine detailing the axial row of raised projections.

Referring to FIGS. 4 and 5, the stator is received within a housing 130. In the case of a hybrid, the housing 130 may be a transmission housing. Alternatively, the housing may be a motor housing which may or may not include additional powertrain components such as a gearbox, differential, or the like. The housing 130 defines a cavity 132 sized to receive the stator 74 therein. In the illustrated embodiment, the cavity 132 is cylindrical.

The housing 130 includes an inner circumferential surface 134 that has a larger inner diameter (ID) than the outer diameter (OD) 106 of the core 80 (excluding the projections 114). The inner surface 134 is in contact with tops 128 of the raised projections 114 and is radially spaced from the outer surface 106 of the core 80 to define a void space 138 in fluid communication with the channels 116. The void space 138 and the channels 116 cooperate to form a fluid circuit 140 that overlays the outer circumferential surface 106 such that the fluid in in direct contact with the stator core 80. The cooling fluid may be oil, such as transmission fluid, or any other dielectric fluid. The direct contact between the cooling fluid and the stator core may increase the thermal efficiency of the thermal management system.

The housing 130 defines at least one inlet port 144 configured to receive the cooling fluid. The inlet port 144 may be an orifice defined through the housing and opening up into the fluid circuit 140. For example, the orifice may extend from the outer surface of the housing 130 to the inner circumferential surface 134. The inlet port 144 may be disposed on the top of the housing 130 so that the fluid will gravity drain around the stator core 80 during operation. The housing 130 may define a drain groove 146 located at the bottom of the housing. The drain groove 146 collects the fluid cascading around the stator core and is connectable to an outlet conduit or the like to carry the fluid back to the sump of the housing for recirculation, for example.

Figure 6:
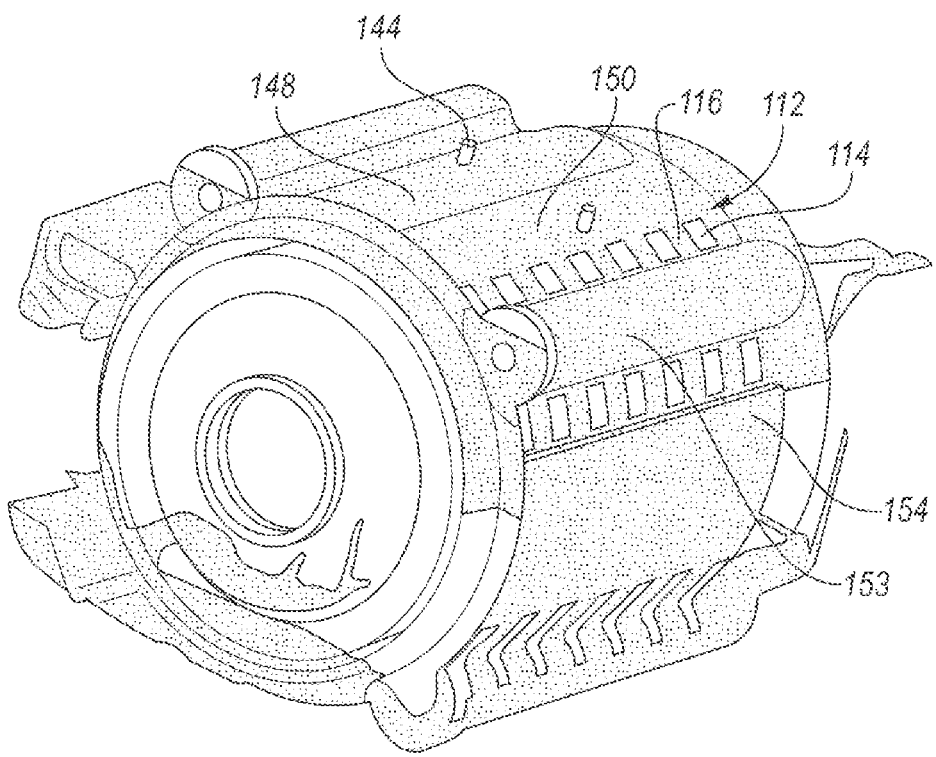
FIG. 6 is a diagrammatical perspective view showing fluid flow around the electric machine when redistribution grooves are present.
Figure 7:
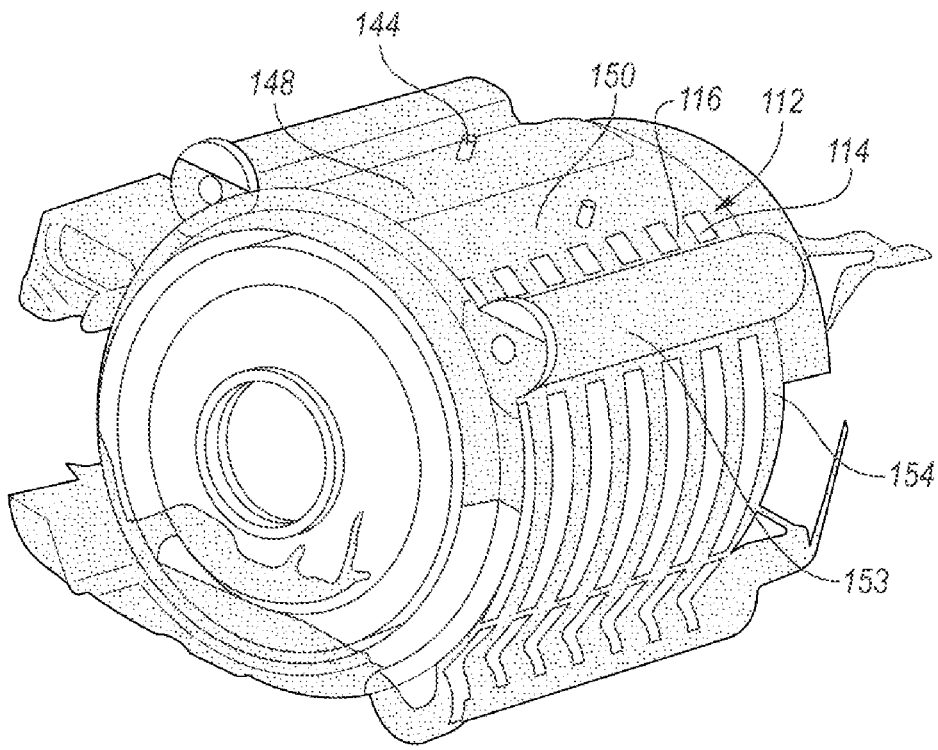
FIG. 7 is a diagrammatical perspective view showing fluid flow around the electric machine when redistribution grooves are not present resulting in stripped flow.

Referring to FIGS. 6 and 7, during operation, fluid 150 enters into the top of the fluid circuit via the inlet port 144. From there, the fluid redistributes itself in the void space and collects in an inlet groove 148. From the inlet groove 148, fluid flows circumferentially left and right to wrap the outer diameter of the stator core 80 in fluid. The fluid 150 then encounters the first row 112 of projections which forces the fluid into the channels 116. The housing 130 defines cutouts 152 that cooperate with the ears 108 to define fluid channels 153 up and around the ears 108. The fluid then flows over the other side of the ear 108 and into the next row 112 of projections and channels.

In order to prevent striped flow of the fluid due to the projections 114 (see FIG. 7), redistribution grooves 154 are defined in the housing 130 downstream of select rows of projections. The redistribution grooves 154 are recessed into the inner surface of the housing 130 and extend in the axial direction of the stator core 80. The redistribution grooves are in fluid communication with the void space and the channels 116 to form a portion of the fluid circuit. The axial row of raised projections has an upstream side and a downstream side, and wherein the redistribution groove 154 is located adjacent to the downstream side so that fluid exiting the channels 116 flows into the redistribution groove 154. The redistribution grooves collect the fluid from the channels 116, store fluid therein, and then release the fluid back to the void space in a uniform manner to mitigate the above-described striped flow. The uniform flow provided by the grooves 154 covers the outer surface of the stator core more uniformly, i.e., greater surface area, then the striped flow and thus provides more uniform cooling.

A radial depth of the redistribution groove 154 is greater than a radial distance between the inner surface of the housing 130 and outer surface of the core 80. The redistribution groove 154 may extend across at least 90 percent of the axial length of the stator core 80. In one or more embodiments, the axial length of the redistribution groove 154 is substantially equal to the axial length of the axial row 112 of raised projections. In the illustrated embodiment, the housing 130 defines three redistribution grooves, however, this is just an example.

The above-described electric machine thermal management system that places the fluid in direct contact stator core to increase cooling. The stator core includes mounting ears 108 and the projection 114 to secure the stator within the housing 130. The tops of the projections engage with the inner surface of the housing 130 to provide additional retention to supplement the mounting ear connections. The redistribution grooves in cooperation with the channels 116 defined between the projections allow for uniform flow around the outer surface of the stator core even though the stator core directly contacts the housing via the projections.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An electric machine comprising:
    a stator core including an outer circumferential surface and an axial row of raised projections that extend radially outboard from the outer surface, wherein the raised projections are axially spaced from each other to define circumferential channels therebetween; and
    a housing defining a cavity that receives the stator core, the housing having an inner circumferential surface in contact with the raised projections and radially spaced from the outer surface of the core to define a void space in fluid communication with the channels, wherein the void space and the channels cooperate to form a fluid circuit that overlays the outer circumferential surface such that the fluid is in direct contact with the stator core, wherein the housing defines a redistribution groove recessed into the inner circumferential surface and extending in an axial direction of the stator core, the redistribution groove being in fluid communication with the void space and the channels to form a portion of the fluid circuit.

2. The electric machine of claim 1, wherein the axial row of raised projections is a plurality of axial rows of raised projections, wherein each of the rows of raised projections are circumferentially spaced from each other, wherein the redistribution grooves is a plurality of redistribution grooves in equal number to the rows of raised projections, and wherein each of the axial rows of raised projections has an associated one of the grooves located adjacent thereto to receive fluid exiting the channels.

3. The electric machine of claim 1, wherein the axial row of raised projections has an upstream side and a downstream side, and wherein the redistribution groove is located adjacent to the downstream side so that fluid exiting the channels flows into the redistribution groove.

4. The electric machine of claim 1, wherein a radial depth of the redistribution groove is greater than a radial distance between the inner and outer circumferential surfaces.

5. The electric machine of claim 1, wherein the redistribution groove extends across at least 90 percent of an axial length of the stator core.

6. The electric machine of claim 1, wherein an axial length of the redistribution groove is substantially equal to the length of the axial row of raised projections.

7. The electric machine of claim 1, wherein the stator is formed of a plurality of stacked laminations including a first set having projection tabs that form the raised projections and a second set that does not include projection tabs to form the channels.

8. The electric machine of claim 7, wherein the laminations of both the first and second sets include mounting tabs that cooperate to define mounting ears that connect with the housing.

9. The electric machine of claim 8, wherein the housing defines cutouts that receive the mounting ears, wherein the cutouts cooperate with the mounting ears to define fluid passages in fluid communication with the void space and channels to form a portion of the fluid circuit.

10. The electric machine of claim 7, wherein the first and second sets include a same number of laminations.

11. The electric machine of claim 1, wherein the housing defines one or more fluid-supply orifices in fluid communication with the void space.

12. The electric machine of claim 1, wherein the housing defines a drain groove recessed into the inner circumferential surface of the housing and extending in an axial direction of the stator core.

13. The electric machine of claim 1 further comprising:
    windings supported on the stator core; and
    a rotor supported for rotation within the stator core.

14. An electric machine comprising:
    a stator having a core and windings supported on the core, the core including a row of raised projections that alternate in an axial direction of the core to define circumferential channels therebetween; and
    a housing defining a cavity that receives the stator core with the projections engaging with a wall of the cavity, wherein the cavity and the core cooperate to define a void space in fluid communication with the channels to form a fluid circuit in direct contact with the stator core, wherein the housing defines a redistribution groove recessed into the wall of the cavity and extending in the axial direction of the stator core, the redistribution groove being in fluid communication with the void space and the channels to form a portion of the fluid circuit, wherein the redistribution grooves are in equal number to the rows of raised projections.

15. The electric machine of claim 14, wherein the row of raised projections has an upstream side and a downstream side, and wherein the redistribution groove is located adjacent to the downstream side so that fluid exiting the channels flows into the redistribution groove.

16. A vehicle powertrain including:
a housing defining a cavity having an inner circumferential surface defining an upper fluid-supply orifice, a lower drain, and an axial groove recessed into the inner circumferential surface, the inner circumferential surface further defining a redistribution groove recessed into the inner surface and extending in an axial direction of the stator core; and
an electric machine received in the cavity, the electric machine including a stator core having an axial row of raised projections that extend radially outboard from an outer surface of the stator core to contact the inner circumferential surface of the housing to form a void space between the inner and outer circumferential surfaces, wherein the raised projections are axially spaced relative to each other to define circumferential channels in fluid communication with the void space, the upper fluid-supply orifice, the lower drain, and the axial groove to form a fluid circuit, wherein the axial groove is located adjacent to the row of raised projections and configured to receive separated fluid flow from the channels and release the fluid to the void space as a laminar flow.

17. The electric machine of claim 16, wherein the redistribution groove being in fluid communication with the void space and the channels to form a portion of the fluid circuit.

18. The electric machine of claim 17, wherein the axial row of raised projections has an upstream side and a downstream side, and wherein the redistribution groove is located adjacent to the downstream side so that fluid exiting the channels flows into the redistribution groove.

19. The electric machine of claim 16, wherein the redistribution grooves are in equal number to the rows of raised projections.

* * * * *